(12) United States Patent
Hayes et al.

(10) Patent No.: US 7,645,089 B2
(45) Date of Patent: Jan. 12, 2010

(54) HUB AND SECONDARY DRIVING ELEMENT SHAFT LOCKING SYSTEM

(75) Inventors: Raymond Jeffery Hayes, Fife Lake, MI (US); Charles James Hayes, Fife Lake, MI (US)

(73) Assignee: Hayes Manufacturing, Inc., Fife Lake, MI (US)

( * ) Notice: Subject to any disclaimer, the term of this patent is extended or adjusted under 35 U.S.C. 154(b) by 257 days.

(21) Appl. No.: 11/380,071

(22) Filed: Apr. 25, 2006

(65) Prior Publication Data

US 2006/0240898 A1    Oct. 26, 2006

Related U.S. Application Data

(60) Provisional application No. 60/674,633, filed on Apr. 25, 2005, provisional application No. 60/678,153, filed on May 5, 2005.

(51) Int. Cl.
    *F16D 1/08* (2006.01)
(52) U.S. Cl. ..................... 403/359.5; 464/182
(58) Field of Classification Search .......... 403/1, 403/355, 359.5, 362; 464/182
    See application file for complete search history.

(56) References Cited

U.S. PATENT DOCUMENTS

| | | | | | |
|---|---|---|---|---|---|
| 166,799 | A | * | 8/1875 | Murdock | 403/362 X |
| 2,355,899 | A | * | 8/1944 | Beede | 403/362 X |
| 2,463,066 | A | * | 3/1949 | Stuvel | 403/362 |
| 2,795,398 | A | * | 6/1957 | Ragland | 403/355 X |
| 2,859,939 | A | * | 11/1958 | Petrell | 403/359.5 X |
| 3,463,520 | A | * | 8/1969 | Turro | 403/362 |
| 4,436,468 | A | * | 3/1984 | Ozaki et al. | 403/362 X |
| 5,437,351 | A | * | 8/1995 | Lindner | 403/359.5 X |
| 5,836,713 | A | * | 11/1998 | Brassert et al. | 403/359.5 |

* cited by examiner

*Primary Examiner*—Greg Binda
(74) *Attorney, Agent, or Firm*—Dickinson Wright PLLC

(57) ABSTRACT

A drive coupling hub (60) includes a body (120) and lugs (126) that extend radially from the body (120) and are engageable with a primemover (54) of a primary power source (14). The lugs (126) have a fastening lug (80) that includes a radially extending bore (82). A bearing (88) is set within the bore (82). A setscrew (90) extends within the bore (82) and applies pressure on the bearing (88) to engage the drive hub to a shaft (58) of a secondary power source (16).

29 Claims, 5 Drawing Sheets

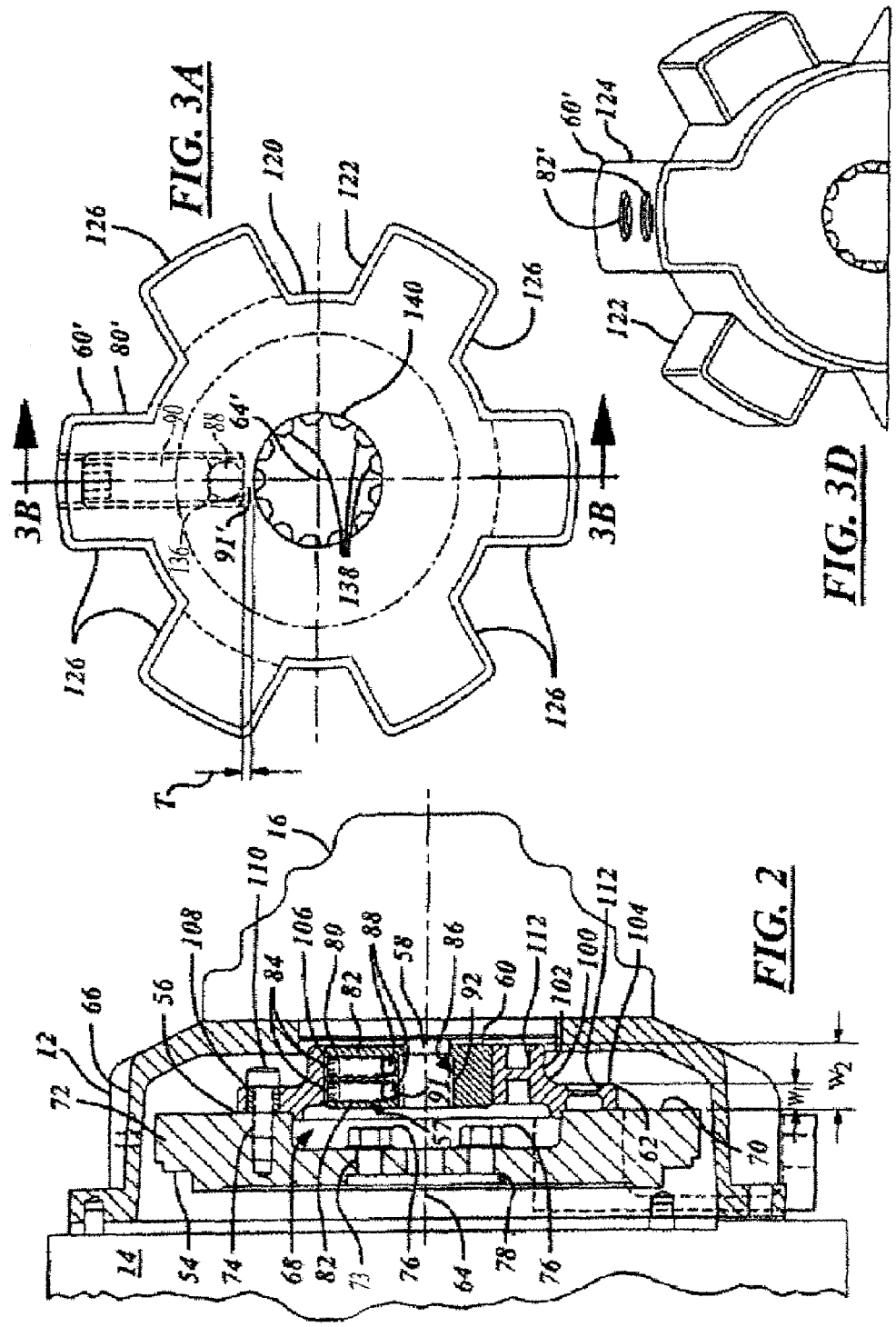

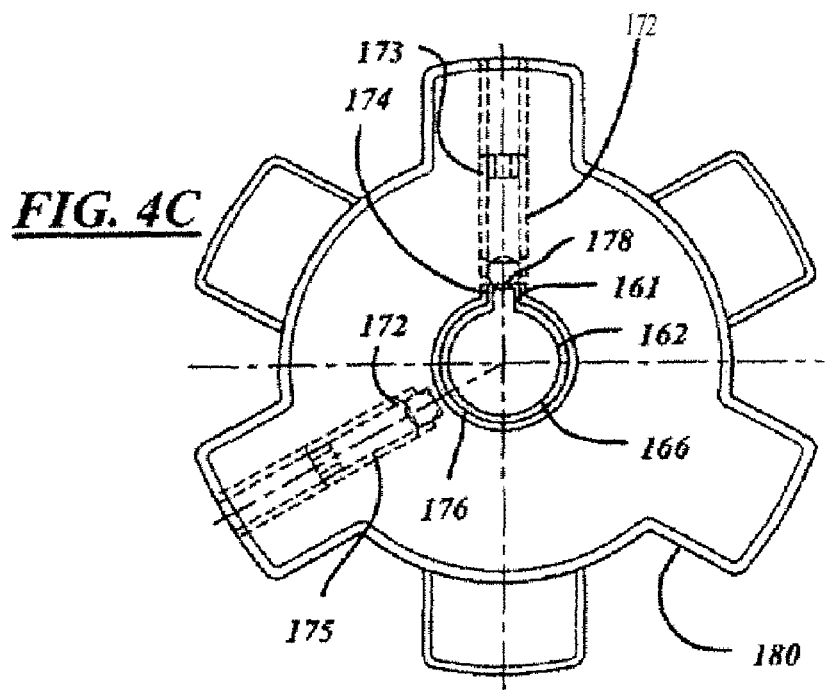
*FIG. 4C*
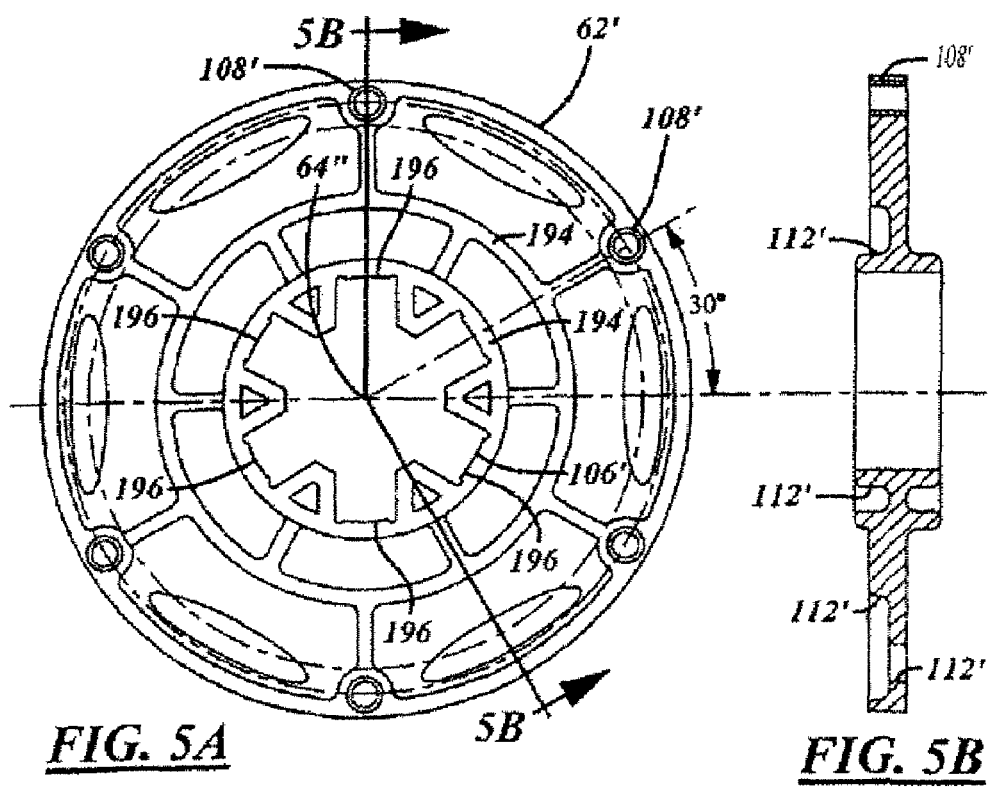
*FIG. 5A*  *FIG. 5B*

HUB AND SECONDARY DRIVING ELEMENT SHAFT LOCKING SYSTEM

CROSS-REFERENCE TO RELATED APPLICATION

The present invention claims priority from U.S. Provisional Application No. 60/674,633, filed on Apr. 25, 2005, entitled "Flywheel Coupling Locking Mechanism" and from U.S. Provisional Application No. 60/678,153, filed on May 5, 2005, also entitled "Flywheel Coupling Locking Mechanism".

TECHNICAL FIELD

The present invention relates to flywheel coupling mechanisms, shaft locking mechanisms, and auxiliary driving systems. More particularly, the present invention is related to a coupling hub and locking it to a shaft, which is driven by a flywheel or primemover.

BACKGROUND OF THE INVENTION

In applications where a transmission, a motor, a pump, or other downstream power conversion/transfer medium or secondary power source is utilized, a flywheel coupling mechanism is often incorporated. The flywheel coupling mechanism is typically used as an adaptor between a primary engine and a shaft of an acted upon secondary power source. Rotational energy from the primary engine is transferred through the flywheel to drive the shaft.

Auxiliary drive systems also utilize a similar flywheel coupling mechanism. The auxiliary drive systems are commonly found on off highway, construction, and commercial vehicles for non-transportation purposes. The auxiliary drive systems typically include an auxiliary engine, which is mounted on a vehicle, separate from a primary drive engine, and is used to drive auxiliary pumps, motors, or other equipment. For example, some auxiliary drive systems are used as bucket lifts, cargo lifts, loaders/unloaders, tools, and equipment or material transfer devices.

There are several types of flywheel coupling mechanisms, such as split type couplings and three hole bore operational couplings. Although prior flywheel coupling mechanisms provide for the attachment of a flywheel to a shaft of a secondary power source, they are limited in their ability to lock and maintain a fixed rigid union therebetween. Over time and use, the flywheel coupling mechanisms tend to loosen, allowing components thereof to shift or slide along the shaft. This movement of the flywheel coupling components can result in the disengagement of the shaft relative to the flywheel, thereby, rendering the system inoperable.

It is desirable that a flywheel coupling mechanism be efficient, inexpensive, and provides a strong, durable, and reliable coupling between a flywheel and a shaft of a secondary power source. Thus, there exists a need for an improved flywheel coupling mechanism that overcomes the abovestated limitations.

SUMMARY OF THE INVENTION

One embodiment of the present invention includes a drive coupling hub that has a body and lugs, which extend radially from the body and are engageable with a primemover of a primary power source. The lugs have a fastening lug that includes a radially extending bore. A bearing is set within the bore. A setscrew extends within the bore and applies pressure on the bearing to engage the drive hub to a shaft of a secondary power source.

Another embodiment of the present invention includes a coupling adaptor that transfers energy between a primemover and a shaft of a secondary power source. The coupling adaptor includes a coupling plate and a drive hub. The coupling plate has primemover attachment points, an inner bore, and notches that extend radially inward toward the inner bore. The drive hub has a body and multiple lugs. The body is configured to couple to the shaft. The lugs extend radially from the body and are engageable with the notches.

The embodiments of the present invention provide several advantages. One such advantage is the provision of a shaft locking system that securely locks onto a shaft of a secondary driving element with increased clamping force over prior known techniques.

Another advantage that is provided by an embodiment of the present invention is a coupling adaptor that provides an efficient, inexpensive, and strong locking mechanism for the coupling and transfer of energy between a flywheel or primemover and a secondary driven shaft.

Yet another advantage provided by the embodiments of the present invention is the disclosure of multiple coupling adaptors for the accommodation of different secondary driven shafts including splined and keyed shafts.

Furthermore, the present invention provides coupling adaptors that are quick and relatively easy to manufacture, assemble, and install. The coupling adaptors are versatile and may be sized and adapted for various applications.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein:

FIG. 2 is a side cross-sectional view of the primemover/shaft coupling assembly incorporating a drive coupling adaptor with a shaft locking system in accordance with an embodiment of the present invention;

FIG. 3A is a back view of a splined drive hub in accordance with an embodiment of the present invention;

FIG. 3D is a perspective view of the splined drive hub of FIG. 3A;

FIG. 4C is a front view of the keyed drive hub of FIG. 4A;

FIG. 5A is a front view of a coupling plate in accordance with an embodiment of the present invention;

FIG. 5B is a side cross-sectional view of the coupling plate of FIG. 5A through section line 5B-5B.

DETAILED DESCRIPTION

Figure 1:
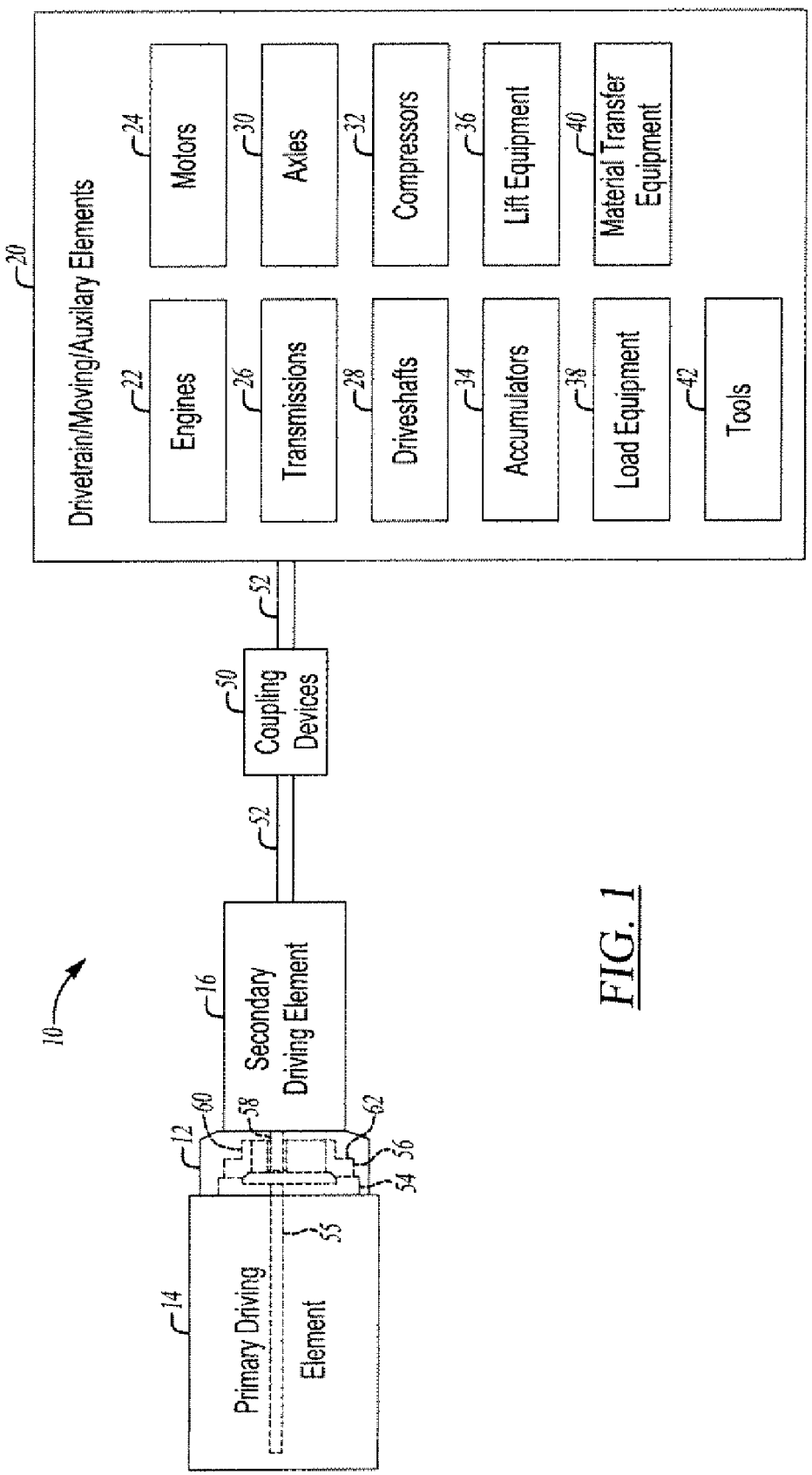
FIG. 1 is a block diagrammatic view of a drive system incorporating a primemover/shaft coupling assembly in accordance with an embodiment of the present invention.

In the following figures the same reference numerals will be used to refer to the same components. While the present invention is described primarily with respect to a drive system that utilizes a coupling adaptor for the transfer of energy from a flywheel or primemover of an engine to a shaft of a secondary power source, the present invention may be applied in and to various applications. The present invention may be utilized in association with various vehicle and non-vehicle applications. The present invention may apply to automotive, aeronautical, nautical, and railway industries, as well as to other industries that utilize energy transfer couplings between a flywheel or primemover and an acted upon shaft. The present invention may be applied to commercial and to non-commercial applications. Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Also, in the following description the term "lug" refers to a radially extending or protruding portion of a hub body. A lug is generally rectangular in shape with significant width. A lug does not refer to spiked or triangularly-shaped teeth that are adjacently placed about a cylindrical object to form a gear or spline. Lugs are generally spaced apart from each other on a body, are less numerous, and are used in different applications than gear teeth or spline teeth.

Referring now to FIG. 1, a block diagrammatic view of a drive system 10 incorporating a primemover/shaft coupling and housing assembly 12 in accordance with an embodiment of the present invention is shown. The drive system 10 includes a primary driving element 14, which drives a secondary driving element 16 via the primemover/shaft coupling assembly 12. The primary driving element 14 and the secondary driving element 16 may be of various types and styles. The primary driving element 14 performs as the original or initial power source and may be in the form of an engine, a combustion engine, an electric motor, a hydraulic motor, a hybrid engine, or in some other form known in the art. The secondary driving source 16 is acted upon by the primary driving element 14 and may also be in the form of a variety of engines or motors, as well as a variety of hydraulic or pneumatic pumps, transmissions, or other secondary power sources or power transfer mediums. In one embodiment of the present invention, the primary driving element 14 is in the form of a combustion engine and the secondary driving element 16 is in the form of a hydraulic pump.

The secondary driving element 16 may be mechanical, electrical, hydraulic, or pneumatic in form or a combination thereof. The secondary driving element 16 may be coupled to and/or incorporated into one or more devices, components, or systems, such as drivetrain elements, vehicle moving elements, auxiliary elements, or the like, which are represented by box 20. The stated drivetrain/moving/auxiliary elements 20 may include engines 22, motors 24, transmissions 26, drive shafts 28, axles 30, compressors 32, accumulators 34, lift equipment 36, loading equipment 38, material transfer equipment 40, tools 42, and other known devices from which power is received from a secondary source of energy. The secondary driving element 16 may be coupled to the drivetrain/moving/auxiliary elements 20 via one or more various known coupling devices, such as hydraulic hoses, air lines, drive shafts, linkages, transfer cases, and unions, which are represented by items, as generally provided by box 50 and lines 52.

The primemover/shaft coupling assembly 12 includes a flywheel or primemover 54, a two-piece drive coupling adaptor 56, and a secondary driving element shaft or secondary driven shaft 58, which are coupled in series. The drive coupling adaptor 56 attaches the secondary shaft 58 to the primemover 54. The drive coupling adaptor 56 transfers rotational energy from the primemover 54 to the secondary shaft 58. The primemover 54 is coupled to the primary driving element 14. The primemover 54 may be mounted on or attached to a crankshaft or other rotating member 55 of the primary driving element 14. The secondary shaft 58 is the driving shaft of the secondary driving element 16.

The drive coupling adaptor 56 includes a drive coupling hub 60 and a coupling plate 62. The drive hub 60 is mounted on the secondary shaft 58 and is disposed within and engages with the coupling plate 62. The coupling plate 62 is mounted on the primemover 54. This is described in further detail below.

Referring now to FIG. 2, a side cross-sectional view of the primemover/shaft coupling assembly 12 incorporating the drive coupling adaptor 56 with a shaft locking system 57 in accordance with an embodiment of the present invention is shown. The primemover/shaft assembly 12 includes the primemover 54, the drive coupling adaptor 56, and the secondary driven shaft 58, as similarly described above. The primemover 54, the drive coupling adaptor 56, and the secondary driven shaft 58 rotate about a longitudinal axis 64 within a bell housing 66, which is sometimes referred to as a pump mount plate, depending upon the application and the secondary driving element incorporated. The secondary driving element 16 is mounted on the bell housing 66. Although not shown, the secondary driving element 16 may be attached to the bell housing 66 via threaded fasteners or other suitable fasteners known in the art. The bell housing 66 may contain a cooling or viscous lubricating fluid.

The primemover 54 is circular in shape and has an inner recessed section 68 and an outer ring section 72. The recessed section 68 is also circular in shape, is on a front side 70 of the primemover 54, and defines the inner dimensions of the outer ring 72. The primemover 54 has a first inner set of holes 73, which are located in the recessed section 68, and a second outer set of holes 74, which are located on the outer ring 72. Primary fasteners 76 extend within and through the first set of holes 73 and thread into a crankshaft base 78 of the primary driving element 14. The second set of holes 74 are used for attachment of the drive coupling adaptor 56 to the primemover 54. The primemover 54 may take on other configurations as will be understood by one of skill in the art.

Figure 3B:
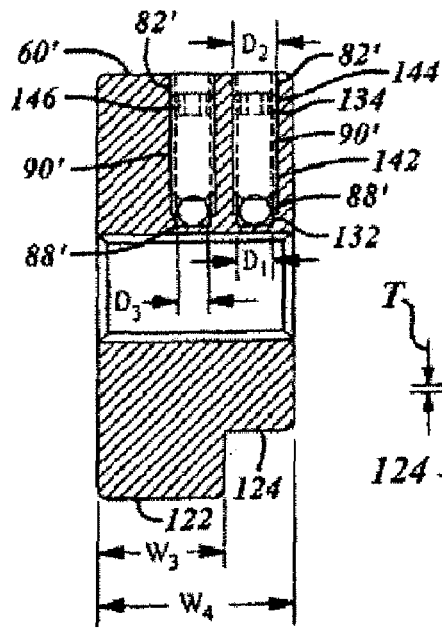
FIG. 3B is a side cross-sectional view of the splined drive hub of FIG. 3A through section line 3B-3B.
Figure 3C:
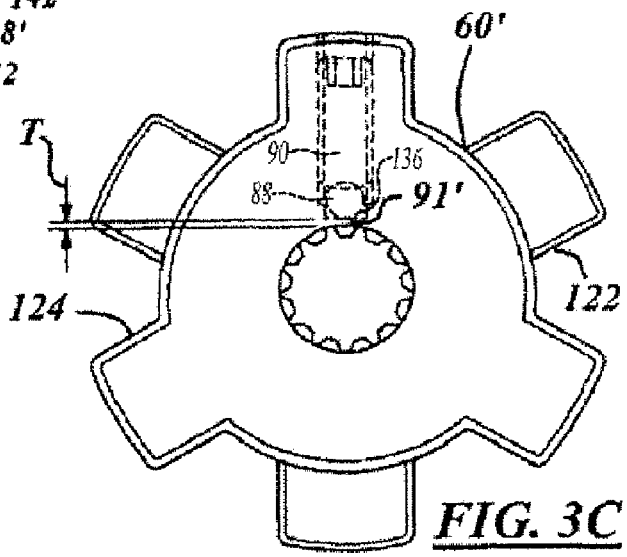
FIG. 3C is a front view of the splined drive hub of FIG. 3A.

The drive coupling adaptor 56 includes the drive hub 60 and the coupling plate 62. The drive hub 60 includes a fastening lug 80 and non-fastening lugs (although not shown, similar non-fastening lugs are shown in FIGS. 3A, 3C, 3D). The fastening lug 80 has the shaft locking system 57, which includes a pair of holes or bores 82, with a pair of balls or bearings 88 and setscrews 90 therein. The shaft locking system 57 has a pre-locked state and an engaged or locked state. The shaft locking system 57 is shown in the pre-locked state. The pre-locked state refers to when the bearings 88 and setscrews 90 are inserted within the bores 82, but are not applying pressure on the spline of the drive hub 60 and the secondary shaft 58, as when in the locked state. This is also the case with the other shaft locking systems disclosed herein. The bores 82 are formed within the fastening lug 80 and have a plurality of inlet openings 84. The bores 82 extend radially outward from the secondary shaft 58 and perpendicular to the axis of rotation 64. The drive hub 60 is designed such that the bores 82 are in-line with and over a predetermined or proper portion of the secondary shaft 58. This portion, as will become more apparent in view of FIGS. 3A-4C, is over a splined or keyed area 86 of the secondary shaft 58. The bearings 88 are disposed within the bores 82 and are used to apply pressure on an inner circumferential separation wall 91, which in turn applies pressure on the secondary shaft 58. This alignment of the bores 82 along with the applied pressure on the bearings 88 on the secondary shaft 58, assures that the coupling between the drive hub 60 and the secondary shaft 58 is maintained.

The separation wall is disposed between the bearings 88 and the splined area 86, which includes a spline (the spline is not called out, but a similar spline can be seen in FIGS. 3A, 3C, and 3D). Although the separation wall 91 is not required, its use can prevent damage to the secondary shaft 58. The wall 91 may be integrally formed as part of the body 120 of the drive hub 60 or may be attached thereto. In one sample embodiment, the thickness T of the wall 91 is approximately 0.025 inches. The thickness T may vary per application.

In the embodiment shown, the setscrews 90 are threaded into the bores 82 and force the bearings 88 against a secondary shaft bore 92 of the drive hub 60. This causes pressure to be applied on the secondary shaft 58. The bearings 88 may be metallic and take on different sizes. Note that although two bores, two bearings, and two setscrews are shown; any number of each may be used and incorporated in one or more of the lugs. Also, each lug of the drive hub 60 may contain one or more of the bores, bearings, and setscrews. The setscrews may be fine or coarse threaded. Also, note that one skilled in the art may envision other modified configurations of that disclosed herein, which apply force on the spline and secondary shaft 58 without the use of bearings and/or setscrews and at the same time preventing damage to the spline and the secondary shaft 58.

The primemover 54 includes an annular section 100, with an inner portion 102 and an outer portion 104, and an inner bore 106. The outer portion 104 has a width $W_1$ that is smaller that the width $W_2$ of the inner portion 102. The outer portion 104 has multiple primemover attachment points (only one is shown in FIG. 2), which in the embodiment shown are in the form of primemover attachment holes 108. Primemover fasteners 110 extend through the primemover attachment holes 108 and are threaded into the primemover 54. The inner bore 106 is configured for reception of the drive hub 60, which is disposed and engaged therein. To save on material costs and to minimize the weight of the coupling plate 62, the coupling plate 62 may have cutout sections 112, such as that shown in the inner portion 102 and the outer portion 104.

Referring now to FIGS. 3A-3D, a back view, a side cross-sectional view, a front view, and a perspective view of a splined drive hub 60' are shown in accordance with an embodiment of the present invention. The splined drive hub 60' is in the form of a toothed wheel and has a generally circular body 120 with a back half 122 and a front half 124. The back half 122 has six radially extending legs Or lugs 126, sometimes referred to as teeth, which extend from and are uniformly spaced around the periphery of the body 120. Three of the lugs 126 are shared with the front half 124. In the embodiment shown, the lugs are at approximately 60° intervals about the center axis of rotation 64'. The arrangement of the lugs 126 provides a symmetrical and balanced rotating drive hub. The width $W_3$ of the back half 122 is smaller than the width $W_4$ of the front half 124. The reduced width of the back half 122 reduces the material costs and weight of the drive hub 60'. Of course, any number of lugs may be used and their sizes, shapes, arrangements and locations may vary. Also, a drive hub may be formed and utilized in which the lugs are not uniformly positioned about the body thereof.

One or more of the lugs 126 are in the form of a fastening lug 80'. The fastening lug 80' includes one or more bores 82', bearings 88', and setscrews 90' (two of each are shown). As shown, the lugs 126 may be in the back half 122 or the front half 124 or a combination thereof. The front half 124, generally, refers to the half of a drive hub that is to be mounted closest to a secondary driving element. Although the bores 82' are in-line with each other along and parallel to the center axis 64', which is parallel to the centerline of a secondary shaft (not shown in FIGS. 3A-3C), they may be out of alignment with each other. The bores 82' have spline sections 132 with first diameters $D_1$ and setscrew sections 134 with second diameters $D_2$. The bearings 88' sit partially within each of the sections 132 and 134, rest on the flat bottoms 136 of each separation wall 91', and are in-line with one of the teeth 138 of the spline 140. Of course, when desired the bearings may not be in alignment with a single tooth of the spline 140. The diameters $D_1$ are larger than the diameter of the bearings $D_3$ and smaller than the diameters $D_2$ to allow the bearings 88' to sit within the spline sections 132. Each of the bearings 88' disperses the forces applied over multiple teeth of the spline 140.

The bores 82' are threaded and receive the setscrews 90'. The setscrews 90' have bearing ends 142 and torque ends 144. The bearing ends 142 are cupped or concaved shaped to correspond with the shape of the bearings 88'. The torque ends 144 have recessed sections 146 to allow the insertion of a torque wrench for position adjustment of the setscrews 90' within the bores 82' and for applied pressure adjustment on the bearings 88'.

The drive hub 60' includes the spline 140. The spline 140, as with the lugs 126, may be attached to or integrally formed as part of the body 120 to form a single unitary structure, as shown. The teeth 138 of the spline 140 correspond to and engage with a similar set of opposing teeth (not shown) on a secondary driven shaft, such as the shaft 58. Due to the shape of the teeth 138, the forces exerted thereon are dispersed onto multiple surfaces of the secondary driven shaft. This provides increased clamping force on the secondary driven shaft, which locks the spline 140 to the secondary driven shaft without causing permanent deformation to the secondary driven shaft, the drive hub 60', or the spline 140.

The drive hub 60' may be formed of a metallic material, such as steel, aluminum, titanium, or other suitable metallic or non-metallic material. The drive hub 60' may be formed using a machining, sintering, drilling, cutting, molding, casting, or other manufacturing process known in the art.

Figure 4A:
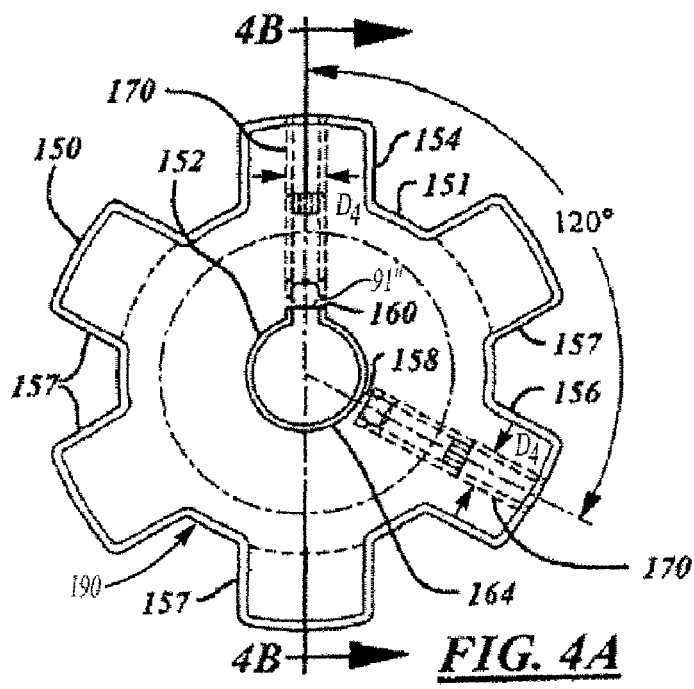
FIG. 4A is a back view of a keyed drive hub in accordance with another embodiment of the present invention.
Figure 4B:
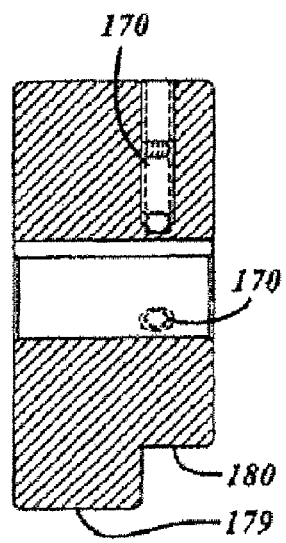
FIG. 4B is a side cross-sectional view of the keyed drive hub of FIG. 4A through section line 4B-4B.

Referring now to FIGS. 4A-4C, a back view, a side cross-sectional view, and a front view of a keyed drive hub 150 are shown in accordance with another embodiment of the present invention. In the embodiment shown, the keyed drive hub 150 has a body 151 with keyed inner bore 152, two fastening lugs 154 and 156, and four non-fastening lugs 157. The keyed inner bore 152 has a notched or keyed portion 160 that coincides with a key 161 on a secondary driven shaft 162. The inner bore 152 also has a non-keyed portion 164 that is generally circular in shape, which coincides with the circumferential remainder 166 of the secondary driven shaft 162.

Each of the two fastening lugs 154 and 156 includes one or more bores 170 (only one per each lug is shown). The bores 170 may be threaded and receive setscrews 172, similar to the setscrews 90 and 90'. The bores 170 have a single section with a single diameter $D_4$. The bores 170 extend to the keyed portion 160 or to the non-keyed portion 164. The setscrews 172 are screwed into the bores 170 to apply pressure on the keyed portion 160 and on the non-keyed portion 164. The setscrews 172 may have fiat ends or concave ends, such as the flat end 174 and the concave end 176, to match the fiat side 178 of the key 161 and the curved shape of the non-keyed portion 164, respectively, Inner circumferential separation wall or walls 158 (only one is shown) may be incorporated between the setscrews 172 and the secondary driven shaft 162. It the embodiment shown, a separation wail is not disposed between the key setscrew 173 and the key 161 and a separation wail is disposed between the shaft setscrew 175 and the secondary driven shaft 162.

In the embodiment shown, the drive hub 150 has a back half 179 and a front half 180. The bores 170 are located in the front half 180 of the drive hub 150 and are approximately 120° apart from each other. Of course, any number of bores may be utilized and the bores maybe located in any of the lugs 157 and in either of the halves 179 and 180. Note also that the bores 170 may extend frilly through the drive hub 150 into the keyed inner bore 152 as shown, or up to one of the walls 91". Thus, the setscrews 172 may be screwed into the keyed inner bore 152 and directly apply pressure on the secondary driven shaft 162 or may apply pressure on the walls 158, thereby, in directly applying pressure on the secondary driven shaft 162.

The keyed drive hub 150 may be formed of similar materials as the splined drive hub 60'. The keyed drive hub 150 may also be of various sizes, shapes, and styles, as well as have any number of lugs, bores, setscrews, keyed portions, and non-keyed portions. Also, for both the keyed drive hub 150 and the splined drive hub 60', fasteners other than the setscrews 90' and 172 may be used and they may extend within the bodies of the drive hubs in areas other then in alignment with and in the lugs thereof. For example, one or more fasteners (not shown) may extend radially through the body 190 of the drive hub 150, in the front half 180, and not within and between the lugs 157 such that the heads or exposed portions thereof are between and do not protrude radially outward away from the body 190 past the lugs 157.

Referring now to FIGS. 5A-5B, a front view and a side cross-sectional view of a coupling plate 62' are shown in accordance with an embodiment of the present invention. The coupling plate 62' is shown as a flat toroidally-shaped or annular disc with an inner bore 106'.

The coupling plate 62' has fastening points 108' that are shown as openings or holes, which allow for the extension of primemover fasteners therethrough. The coupling plate 62' also has cutouts 112' of varying size and shape, some of which are in the form of grooves 194. The cutouts 112' are uniformly dispersed about the coupling plate 62' to provide balance. The coupling plate 62' may take on a variety of shapes, sizes, and layouts. The coupling plate 62' may also be formed of metallic or non-metallic materials. In one embodiment, the plate is formed of plastic.

The inner bore 106' has multiple notches 196 that extend radially inward towards and are open to the inner bore 106'. The notches 196 are in the form of axial channels that extend longitudinally along and are uniformly arranged around the axis of rotation 64", and are inwardly open to the inner bore 106'. The notches 196 correspond in size and shape to and receive and engage with the lugs of a drive hub, such as the lugs 126, 154, 156, and 157. Thus, the number size and orientation of the notches 196 matches that of the associated lugs. The sizes and shapes of the lugs 126, 154, 156, and 157 and the notches 196 may vary per application.

Figure 6:
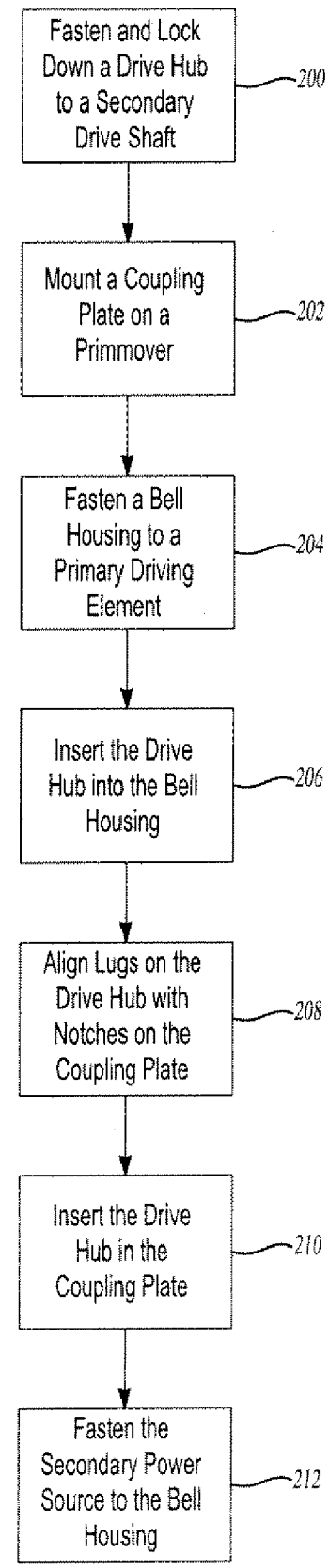
FIG. 6 is a logic flow diagram illustrating a sample method of assembling and installing a primemover/shaft coupling assembly in accordance with an embodiment of the present invention.

Referring now to FIG. 6, a logic flow diagram illustrating a sample method of assembling and installing a primemover/shaft coupling assembly in accordance with an embodiment of the present invention is shown.

In step 200, a drive hub, such as one of the drive hubs 60, 60', and 150 is fastened and locked down to a secondary driven shaft of a secondary driving element, as described above.

In step 202, a coupling plate, such as the coupling plate 62 and 62', is mounted onto a primemover. In step 204, an engine bell housing or pump mount plate, such as the bell housing 66, is placed over the primemover and the coupling plate and is fastened to a primary driving element.

In step 206, the drive hub with the secondary driven shaft attached thereto is inserted into the bell housing. In step 208, the lugs on the drive hub are aligned with the notches on the coupling plate. In step 210, the drive hub is inserted within the inner bore of the coupling plate. The lugs, such as the lugs 126, 154, 156, and 157, are inserted within the notches of the coupling plate, such as the notches 196. In step 212, the secondary power source is fastened to the bell housing or rigidly held thereto.

The above-described steps are meant to be illustrative examples; the steps may be performed sequentially, synchronously, simultaneously, or in a different order depending upon the application and desired implementation.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A drive coupling hub for engagement with a shaft of a secondary power source to transfer energy from a primary driving element, comprising:

a body portion having an inner periphery, said inner periphery being engageable with the shaft of the secondary power source, said body portion intended to communicate with a primary driving element to effectuate rotation thereof;

at least one radially extending bore formed in said body portion, said bore having an end adjacent said inner periphery;

at least one bearing within said at least one radially extending bore, said at least one bearing being located at said end adjacent said inner periphery;

a separation wall disposed between said at least one bearing and said inner periphery to prevent direct contact between said at least one bearing and the drive shaft; and at least one device extending within said at least one radially extending bore and applying pressure to said at least one bearing, which applies pressure to said separation wall, and to the shaft of the secondary power source that is received within said inner periphery to effectuate constant engagement between the hub and the shaft.

2. The hub of claim 1, wherein said body portion includes a plurality of lugs that extend radially outward away from said inner periphery, each of said plurality of lugs are uniformly spaced from one another.

3. The hub of claim 2, wherein said plurality of lugs comprises six symmetrically arranged lugs.

4. The hub of claim 2, wherein said inner periphery of said body portion is splined.

5. The hub of claim 2, wherein said at least one radially extending bore is formed in one of said plurality of lugs.

6. The hub of claim 5, further comprising:
a plurality of radially extending bores in at least one of said plurality of lugs.

7. The hub of claim 5, further comprising:
a second radially extending bore formed in another of said plurality of lugs.

8. The hub of claim 7, further comprising:
a second bearing disposed in an end of said second radially extending bore adjacent said inner periphery and a second device disposed in said second radially extending bore to apply pressure to the shaft.

9. The hub of claim 2, wherein said body portion includes a front half and a back half with each said plurality of lugs extending from at least said back half, while less than each of said plurality of logs extend from said front half.

10. The hub of claim 1, wherein said separation wall has a substantially flat inner surface.

11. The hub of claim 1, wherein said at least one securing device is a set screw.

12. The hub of claim 11, wherein said set screw includes a bearing end and a torque end, said bearing end being generally cup-shaped to substantially conform to the shape of said at least one bearing.

13. A drive coupling hub for engagement with a shaft of a secondary power source, comprising:
a body potion having an inner periphery and an outer periphery, said body portion consisting of a plurality of uniformly spaced outwardly extending lugs;
said body potion being engageable with the shaft of the secondary power source to effectuate rotation thereof;
at least one radially extending bore formed in at least one of said plurality of lugs, said at least one bore having an open end adjacent said outer periphery and a closed end adjacent said inner periphery, said closed end having a substantially flat bottom surface;
at least one bearing within said at least one radially extending bore, said at least one bearing being located at said end adjacent said inner periphery and resting on said substantially flat bottom surface;
at least one securing device disposed within said at least one radially extending bore for applying pressure to said at least one bearing and to the shaft of the secondary power source that is received within said inner periphery to effectuate constant engagement between the hub and said drive shaft;
whereby the drive hub is securely engaged to the shaft while minimizing damage to the shaft.

14. The hub of claim 13, wherein said plurality of lugs comprises six symmetrically arranged lugs.

15. The hub of claim 13, wherein said inner periphery of said body portion is splined.

16. The hub of claim 13, wherein said at least one securing device is a set screw.

17. The hub of claim 16, wherein said set screw includes a bearing end and a torque end, said generally cup shaped to substantially conform to the shape of said at least one bearing.

18. The hub of claim 13, wherein said at least one radially extending bore is formed in one of said plurality of lugs.

19. The hub of claim 13, further comprising:
a second radially extending bore formed in another of said plurality of lugs.

20. The hub of claim 19, further comprising:
a second bearing disposed in an end of said second radially extending bore adjacent said inner periphery and a second device disposed in said second radially extending bore to apply pressure to the shaft.

21. A drive hub for engaging a shaft of a secondary power source and control operation thereof comprising:
a body portion having a plurality of lugs extending outwardly therefrom;
an inner bore formed through said body portion and having a periphery, said inner bore being large enough to accommodate the shaft of the secondary power source therethrough, said periphery intended to engage the shaft of the secondary power source;
a radially extending bore formed in at least one of said plurality of lugs, said bore having a closed interior end defined by a partition wall that separates said bore from said periphery and an open outer end;
at least one substantially round bearing disposed in said bore and in contact with said partition wall;
at least one securing device located within said bore and having a torque end and a bearing end that contacts a surface of said at least one bearing;
whereby said securing device is intended to apply pressure to said at least one bearing to cause said periphery to contact and secure the shaft of the secondary power source to effectuate rotation thereof as needed.

22. The hub of claim 21, wherein said plurality of lags are uniformly spaced from one another about an outer periphery of said body portion.

23. The hub of claim 22, wherein said plurality of tugs comprises six symmetrically arranged lugs.

24. The hub of claim 21, wherein said periphery is keyed to effectuate secure engagement between the hub and the shaft.

25. The hub of claim 21, wherein said separation wall has a substantially flat inner surface.

26. The hub of claim 25, wherein said at least one securing device is a threaded device.

27. The hub of claim 26, wherein said at least one securing device is a set screw.

28. The hub of claim 27, wherein aid bearing end of mid set screw is generally cup shaped to substantially conform to the shape of said at least one bearing.

29. The hub of claim 21, wherein said body portion includes a front half and a back half with each said plurality of lugs extending from at least said back half, while less than each of said plurality of lugs extend from said front half.

* * * * *

UNITED STATES PATENT AND TRADEMARK OFFICE
CERTIFICATE OF CORRECTION

PATENT NO. : 7,645,089 B2
APPLICATION NO. : 11/380071
DATED : January 12, 2010
INVENTOR(S) : Hayes et al.

It is certified that error appears in the above-identified patent and that said Letters Patent is hereby corrected as shown below:

Column 5, line 64: "Or" should read --or--.

Column 7, line 11: "fiat" should read --flat--.

Column 7, line 12: "fiat" should read --flat--.

Column 7, line 17: "It" should read --In--.

Column 7, line 17: "wail" should read --wall--.

Column 7, line 19: "wail" should read --wall--.

Column 7, line 27: "frilly" should read --fully--.

Column 9, Claim 9, line 21: "logs" should read --lugs--.

Column 9, Claim 13, line 32: "potion" should read --portion--.

Column 9, Claim 13, line 35: "potion" should read --portion--.

Column 10, Claim 22, line 38: "lags" should read --lugs--.

Column 10, Claim 23, line 41: "tugs" should read --lugs--.

Column 10, Claim 28, line 51: "aid" should read --said--.

Column 10, Claim 28, line 51: "mid" should read --said--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,645,089 B2
APPLICATION NO. : 11/380071
DATED : January 12, 2010
INVENTOR(S) : Hayes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this

Sixteenth Day of November, 2010

David J. Kappos
*Director of the United States Patent and Trademark Office*